(12) United States Patent
Hong

(10) Patent No.: US 12,441,317 B2
(45) Date of Patent: Oct. 14, 2025

(54) AUTOMATED LANE CHANGING DEVICE AND METHOD FOR VEHICLE

(71) Applicant: NIO TECHNOLOGY (ANHUI) CO., LTD, Hefei (CN)

(72) Inventor: Guokai Hong, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 176 days.

(21) Appl. No.: 17/713,331

(22) Filed: Apr. 5, 2022

(65) Prior Publication Data

US 2022/0315003 A1    Oct. 6, 2022

(30) Foreign Application Priority Data

Apr. 6, 2021   (CN) .......................... 202110365612.0

(51) Int. Cl.
| | |
|---|---|
| *B60W 30/08* | (2012.01) |
| *B60W 30/18* | (2012.01) |
| *B60W 50/00* | (2006.01) |
| *B60W 60/00* | (2020.01) |
| *B62D 15/02* | (2006.01) |

(52) U.S. Cl.
CPC ... *B60W 30/18163* (2013.01); *B60W 50/0098* (2013.01); *B60W 2520/105* (2013.01); *B60W 2552/10* (2020.02); *B60W 2554/802* (2020.02)

(58) Field of Classification Search
CPC ........ B62D 15/0255; B60W 30/18163; B60W 50/0098; B60W 2520/105; B60W 2552/10; B60W 2554/802; B60W 2554/00; B60W 2554/804; B60W 30/08; B60W 60/001

USPC .......................................................... 701/23
See application file for complete search history.

(56) References Cited

U.S. PATENT DOCUMENTS

| | | | |
|---|---|---|---|
| 2019/0004529 A1* | 1/2019 | Im .......................... | G05D 1/0223 |
| 2019/0092333 A1* | 3/2019 | Ishioka ............... | B60W 30/095 |
| 2019/0126927 A1 | 5/2019 | Uejima | |
| 2020/0050195 A1 | 2/2020 | Gross et al. | |
| 2020/0264900 A1* | 8/2020 | Cheriton ............ | B60W 60/0011 |
| 2020/0265710 A1 | 8/2020 | Zhan et al. | |

(Continued)

FOREIGN PATENT DOCUMENTS

| | | |
|---|---|---|
| CN | 110962853 | 4/2020 |
| KR | 10-2020-0132652 | 11/2020 |

OTHER PUBLICATIONS

Extended Search Report for European Patent Application No. 22165286.0, dated Sep. 16, 2022, 8 pages.

(Continued)

*Primary Examiner* — Rachid Bendidi
*Assistant Examiner* — Hossam M Abd El Latif
(74) *Attorney, Agent, or Firm* — Sheridan Ross P.C.

(57) ABSTRACT

The disclosure relates to an automated lane changing method for a vehicle. The method includes: obtaining a plurality of areas in a target lane; calculating, based on information about an obstacle included in each area in the plurality of areas, an expected lane changing point for the area; and selecting, based on the expected lane changing point and an availability check result for the plurality of areas, a first area in the plurality of areas as a target area for final lane changing. The disclosure further relates to an automated lane changing device for a vehicle, a computer storage medium, and a vehicle.

9 Claims, 2 Drawing Sheets

(56) References Cited

U.S. PATENT DOCUMENTS

2020/0307582 A1* 10/2020 Sato .................. B60W 50/10
2021/0253104 A1*  8/2021 Takamatsu ........ B60W 60/0021
2021/0403045 A1* 12/2021 Lin ..................... G08G 1/166
2022/0144309 A1*  5/2022 Hwu .................. B60W 30/12

OTHER PUBLICATIONS

Official Action with Machine Translation for China Patent Application No. 202110365612.0, dated Mar. 28, 2025, 16 pages.

* cited by examiner

AUTOMATED LANE CHANGING DEVICE AND METHOD FOR VEHICLE

CROSS-REFERENCE TO RELATED APPLICATION

This application claims the benefit of Chinese Patent Application No. 202110365612.0 filed Apr. 6, 2021, the contents of which are incorporated herein by reference in its entirety.

TECHNICAL FIELD

The disclosure relates to the field of automated lane changing control for vehicles, and more particularly, to an automated lane changing device and method for a vehicle, a computer storage medium, and a vehicle.

BACKGROUND ART

At the present stage, vehicle control technology is developing in the direction of "intelligent vehicles". More and more advanced apparatuses such as a sensor, a controller, and an actuator are added to a regular vehicle, providing the vehicle with an intelligent environment sensing capability to automatically analyze safe and dangerous traveling states of the vehicle, and enabling the vehicle to reach a destination as expected, thereby finally taking the place of human to operate.

Lane changing is a common operation during traveling of a vehicle. At present, a lane changing assistance function is a common function in ADAS functions. However, most of the current researches on lane changing assistance focus on lane changing trajectory planning, and according to an existing automated lane changing function, there is a low probability of successful lane changing in a relatively complex scenario.

Therefore, an improved automated lane changing solution for a vehicle is desired.

SUMMARY OF THE INVENTION

According to an aspect of the disclosure, there is provided an automated lane changing method for a vehicle. The method includes: obtaining a plurality of areas in a target lane; calculating, based on information about an obstacle included in each area in the plurality of areas, an expected lane changing point for the area; and selecting, based on the expected lane changing point and an availability check result for the plurality of areas, a first area in the plurality of areas as a target area for final lane changing.

As a supplement or an alternative to the foregoing solution, the foregoing method may further include: outputting information associated with the first area based on the selection of the first area, to perform lane changing planning and control.

As a supplement or an alternative to the foregoing solution, in the foregoing method, the information associated with the first area includes: a relative distance between a host vehicle and an obstacle in the first area, a lane changing time, and an average acceleration/deceleration.

As a supplement or an alternative to the foregoing solution, in the foregoing method, the plurality of areas are determined based on a target signal input by a vehicle sensor, and include an overtake-to-change-lane area, a wait-to-change-lane area, and a direct lane changing area.

As a supplement or an alternative to the foregoing solution, in the foregoing method, the availability check result for the plurality of areas includes areas available for lane changing in the plurality of areas, and the areas available for lane changing are determined based on motion information of the host vehicle and of an obstacle around the host vehicle.

As a supplement or an alternative to the foregoing solution, in the foregoing method, the areas available for lane changing include two or more areas, and selecting, based on the expected lane changing point and an availability check result for the plurality of areas, a first area in the plurality of areas as a target area for final lane changing includes: calculating, for each area in the two or more areas, a score of the host vehicle to an expected lane changing point corresponding to the area; and selecting an area with the highest score as the target area for final lane changing, where the score of the host vehicle to the expected lane changing point corresponding to the area is calculated based on safety of the host vehicle changing lane to the area, lane changing efficiency, and comfort.

According to another aspect of the disclosure, there is provided an automated lane changing device for a vehicle. The device includes: a receiving apparatus configured to receive a plurality of areas in a target lane; a calculation apparatus configured to calculate, based on information about an obstacle included in each area in the plurality of areas, an expected lane changing point for the area; and a selection apparatus configured to select, based on the expected lane changing point and an availability check result for the plurality of areas, a first area in the plurality of areas as a target area for final lane changing.

As a supplement or an alternative to the foregoing solution, the foregoing device may further include: an output apparatus configured to output information associated with the first area based on the selection of the first area, to perform lane changing planning and control.

As a supplement or an alternative to the foregoing solution, in the foregoing device, the information associated with the first area includes: a relative distance between a host vehicle and an obstacle in the first area, a lane changing time, and an average acceleration/deceleration.

As a supplement or an alternative to the foregoing solution, the foregoing device may further include: a division apparatus configured to divide the target lane into a plurality of areas based on a target signal input by a vehicle sensor, where the plurality of areas include an overtake-to-change-lane area, a wait-to-change-lane area, and a direct lane changing area.

As a supplement or an alternative to the foregoing solution, the foregoing device may further include: a check apparatus configured to check areas available for lane changing in the plurality of areas based on motion information of the host vehicle and of an obstacle around the host vehicle.

As a supplement or an alternative to the foregoing solution, in the foregoing device, the areas available for lane changing include two or more areas, and the selection apparatus is configured to: calculate, for each area in the two or more areas, a score of the host vehicle to an expected lane changing point corresponding to the area; and select an area with the highest score as the target area for final lane changing, where the score of the host vehicle to the expected lane changing point corresponding to the area is calculated based on safety of the host vehicle changing lane to the area, lane changing efficiency, and comfort.

According to still another aspect of the disclosure, there is provided a computer storage medium including instructions, where when the instructions are executed, the method as described above is performed.

According to yet another aspect of the disclosure, there is provided a vehicle, including the device as described above.

Compared with the prior art, the automated lane changing solution for a vehicle in the embodiments of the disclosure includes: calculating an expected lane changing point of each area in a plurality of areas divided from a target lane, and selecting a target area for final lane changing (i.e. an optimal area) based on the expected lane changing point and an availability check result for the plurality of areas. In this way, the host vehicle can behave more intelligently during lane changing, and the success rate and safety of lane changing can be improved.

In addition, an optimal lane changing position and a time window required to reach this position can be calculated based on the finally selected target area, such that a downstream module can better perform lane changing planning and control.

BRIEF DESCRIPTION OF THE DRAWINGS

The above and other objectives and advantages of the disclosure will be more thorough and clearer from the following detailed description in conjunction with the drawings, where the same or similar elements are represented by the same reference numerals.

DETAILED DESCRIPTION OF EMBODIMENTS

To make the objectives, technical solutions, and advantages of the disclosure clearer, specific embodiments of the disclosure will be described in further detail below with reference to the accompanying drawings. It can be understood that the specific embodiments described herein are used merely to explain the disclosure, rather than limit the disclosure.

In addition, it should also be noted that, for ease of description, the accompanying drawings show only parts related to the disclosure rather than all content of the disclosure. Before discussing exemplary embodiments in more detail, it should be noted that some exemplary embodiments are described as processes or methods that are depicted as flowcharts. Although the flowcharts describe various operations (or steps) as sequential processing, many of the operations may be implemented in parallel, concurrently, or simultaneously. In addition, the sequence of the operations may be rearranged. The processing may be terminated when its operations are completed, but it may also have additional steps not included in the accompanying drawings. The processing may correspond to methods, functions, procedures, subroutines, subprograms, and so on.

Although exemplary embodiments are described as using a plurality of units to perform exemplary processes, it should be understood that these exemplary processes may also be performed by one or more modules.

Moreover, control logic of the disclosure may be included on a computer-readable medium as executable program instructions, which are implemented by a processor or the like. Instances of the computer-readable medium include, but are not limited to, a ROM, a RAM, an optical disc, a magnetic tape, a floppy disk, a flash drive, a smart card, and an optical data storage apparatus. A computer-readable recording medium may also be distributed in a computer system connected to a network, so that the computer-readable medium is stored and implemented in a distributed manner, for example, through a vehicle telematics service or a controller area network (CAN).

Unless specifically mentioned or obvious from context, as used herein, the term "approximately" is understood to be within a range of normal tolerance in the art, for example, within two standard deviations of a mean.

It should be understood that the term "vehicle" or other similar terms used herein includes general motor vehicles, such as passenger vehicles (including sport utility vehicles, buses, trucks, etc.), various commercial vehicles, etc., and includes hybrid vehicles, electric vehicles, etc. A hybrid vehicle is a vehicle with two or more power sources, such as a vehicle powered by a gasoline engine and an electric motor.

An automated lane changing solution for a vehicle in various exemplary embodiments according to the disclosure will be described below in detail with reference to the accompanying drawings.

Figure 1:
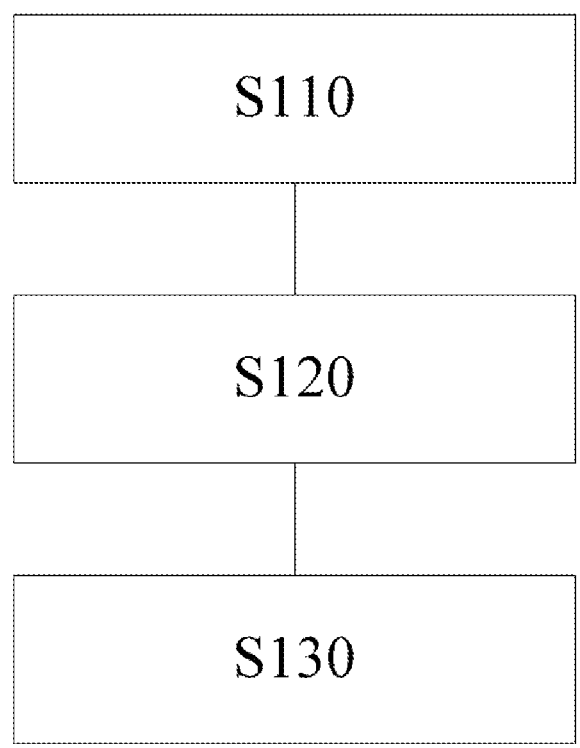
FIG. 1 is a schematic flowchart of an automated lane changing method for a vehicle according to an embodiment of the disclosure.

FIG. 1 is a schematic flowchart of an automated lane changing method 1000 for a vehicle according to an embodiment of the disclosure. As shown in FIG. 1, the automated lane changing method 1000 for a vehicle includes the following steps:

step S110: obtaining a plurality of areas in a target lane;

step S120: calculating, based on information about an obstacle included in each area in the plurality of areas, an expected lane changing point for the area; and step S130: selecting, based on the expected lane changing point and an availability check result for the plurality of areas, a first area in the plurality of areas as a target area for final lane changing.

In the context of the disclosure, the term "target lane" refers to a lane to which a vehicle is to change. For example, the "target lane" may be a lane adjacent to a current driving lane.

The term "obstacle" refers to a collective name for landforms, objects, and facilities that can hinder or prevent the movement of a vehicle. In one or more embodiments, the obstacle may include a traveling or stationary vehicle in a lane, a construction area, etc.

Figure 3:
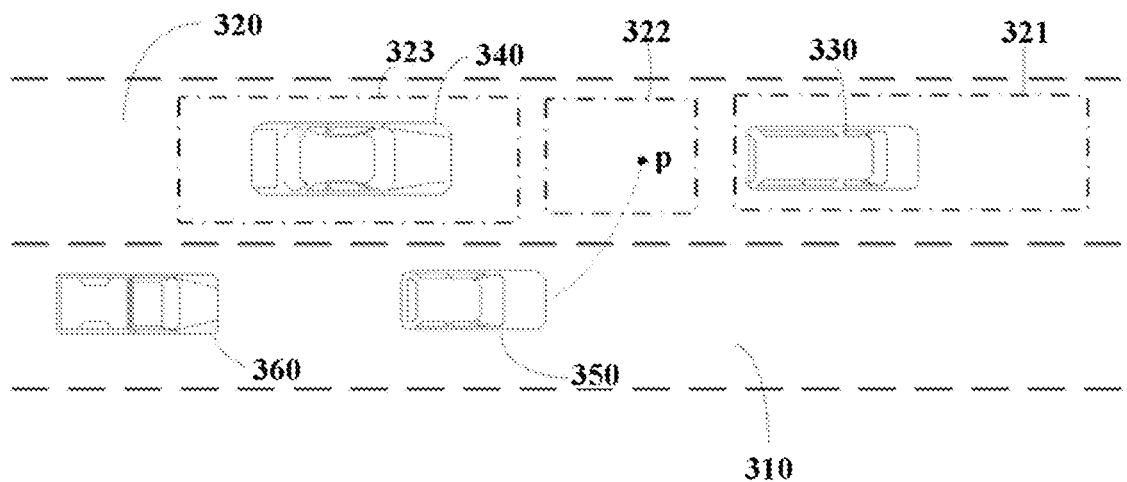
FIG. 3 is a diagram of an automated lane changing scenario for a vehicle according to an embodiment of the disclosure.

The term "expected lane changing point" refers to an expected (optimal) lane changing terminal point position after lane changing. The expected lane changing point may be calculated based on information about an obstacle included in an area. For example, referring to FIG. 3, FIG. 3 is a diagram of an automated lane changing scenario for a vehicle according to an embodiment of the disclosure. As shown in FIG. 3, the host vehicle 350 is traveling in a lane 310 with a vehicle 360 behind. In a lane 320 adjacent to the lane 310, there are also two vehicles traveling, which are respectively vehicles 330 and 340. The vehicle 330 is traveling ahead on the left of the host vehicle 350, while the vehicle 340 is traveling behind on the left of the host vehicle 350. The lane 320 is divided into a plurality of areas 321, 322, and 323. Based on obstacle information (that is, there is no obstacle) in the area 322, an expected lane changing point P is calculated. For the expected lane changing point, factors of a safe distance (that is, a safe distance from the vehicle 330 ahead and from the vehicle 340 behind) and lane changing efficiency (going forward as much as possible, that is, as close to the vehicle 330 ahead as possible while ensuring the safe distance) are comprehensively considered.

The term "availability check result" refers to a result calculated or determined based on a safety condition for lane changing for the host vehicle and indicating whether the host vehicle can complete lane changing in an area. The term "target area for lane changing" refers to an optimal area that is selected based on the expected lane changing point and an availability check result for the plurality of areas. In other words, the area provides a better comprehensive performance in terms of comfort, safety, lane changing efficiency, etc. than other areas.

In the foregoing automated lane changing method 1000 for a vehicle, the "first area" selected from the plurality of areas of the target lane is the target area for final lane changing, and the first area is calculated based on a motion status of an obstacle in the target lane. Based on the selected target area for lane changing, an optimal lane changing position can be further obtained, and a time required to reach this position can be calculated. In this way, while the safety of the host vehicle is ensured, the success rate of lane changing thereof is further improved, allowing the vehicle to behave more "intelligently".

Although not shown in FIG. 1, the automated lane changing method 1000 for a vehicle may further include: outputting information associated with the first area based on the selection of the first area, to perform lane changing planning and control. In an embodiment, the information associated with the first area includes a relative distance between a host vehicle and an obstacle in the first area, a lane changing time, and an average acceleration/deceleration. For example, based on the selected area, an expected lane changing point in the area (for example, 20 meters ahead on the left of the host vehicle, or a position relative to an obstacle vehicle, which is not limited herein), a time taken to reach the expected lane changing point (for example, it takes 1.5 seconds to reach the position), and an acceleration (for example, moving forward with an acceleration of 5 m/s$^2$) can be determined.

In one or more embodiments, the plurality of areas are determined based on a signal input by a vehicle sensor, and include an overtake-to-change-lane area, a wait-to-change-lane area, and a direct lane changing area.

Back to FIG. 3, three areas are shown in the target lane 320, which are receptively an overtake-to-change-lane area 321, a direct lane changing area 322, and a wait-to-change-lane area 323. Here, the term "overtake-to-change-lane area" generally refers to an area related to lane changing performed after the host vehicle 350 accelerates (overtakes). The term "direct lane changing area" generally refers to an area related to direct lane changing performed by the host vehicle 350 (without acceleration or deceleration). The term "wait-to-change-lane area" generally refers to an area related to lane changing performed after the host vehicle 350 decelerates. In an embodiment, the plurality of areas may be determined based on a position of the host vehicle relative to the obstacle in the target lane. In another embodiment, the plurality of areas may be divided based on vehicle condition information of the host vehicle (such as a current speed and vehicle performance) of the host vehicle.

In an embodiment, the areas available for lane changing include two or more areas, and step S130 includes: calculating, for each area in the two or more areas, a score of the host vehicle to an expected lane changing point corresponding to the area; and selecting an area with the highest score as the target area for final lane changing, where the score of the host vehicle to the expected lane changing point corresponding to the area is calculated based on safety of the host vehicle changing lane to the area (for example, ensuring a safe distance from a vehicle ahead and from a vehicle behind in the target lane, a safe distance from a vehicle behind in the current lane, etc.), lane changing efficiency (for example, a short lane changing time), and comfort (for example, a small speed fluctuation).

In the foregoing method 1000, an obstacle around the vehicle is fully considered, and an expected lane changing point and a time window required for the host vehicle to reach the expected lane changing point are calculated based on the motion information of the obstacle.

According to one or more embodiments of the disclosure, before the start of lane changing for the vehicle and/or throughout the lane changing process, an optimal area of the target lane for lane changing is determined in real time, and a time window during which the host vehicle should implement the lane changing is calculated, so that the downstream module can better perform lane changing planning and control.

For example, when there is a lane changing request, if the host vehicle cannot directly start lane changing currently, a position at which the lane changing can be started, and a time required to reach this position are first calculated. If the lane changing can be performed currently, areas in which the lane changing can be performed are calculated according to the situation of the surrounding obstacle, and an area that best meets driver expectations is selected therefrom. During lane changing, an optimal area for lane changing is also calculated in real time in this method. If lane changing cannot be performed due to an obstacle around the vehicle, whether the host vehicle can return to the original lane is calculated in this method.

The foregoing method 1000 is particularly applicable to an unmanned driving scenario. For an unmanned driving system, the vehicle has a more stable steering and speed, and thus a more stable driving operation and moving trajectory, and the calculated expected lane changing point is more accurate.

Figure 2:
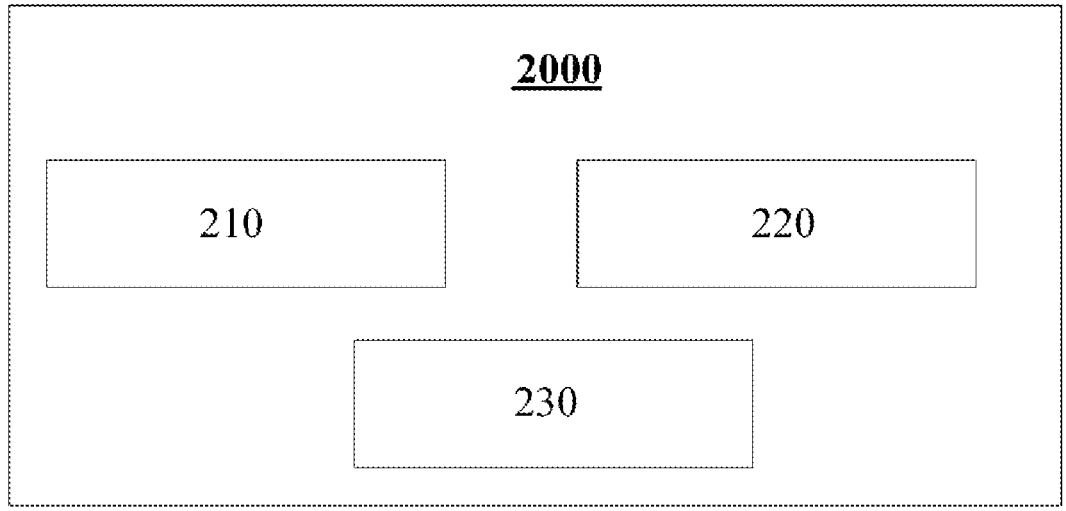
FIG. 2 is a schematic structural diagram of an automated lane changing device for a vehicle according to an embodiment of the disclosure.

Referring to FIG. 2, FIG. 2 shows an automated lane changing device 2000 for a vehicle according to an embodiment of the disclosure. The device 2000 includes: a receiving apparatus 210, a calculation apparatus 220, and a selection apparatus 230. The receiving apparatus 210 is configured to receive a plurality of areas in a target lane; the calculation apparatus 220 is configured to calculate, based on information about an obstacle included in each area in the plurality of areas, an expected lane changing point for the area; and the selection apparatus 230 is configured to select, based on the expected lane changing point and an availability check result for the plurality of areas, a first area in the plurality of areas as a target area for final lane changing.

Although not shown in FIG. 2, in an embodiment, the automated lane changing device 2000 for a vehicle may further include an output apparatus. The output apparatus is configured to output information associated with the first area based on the selection of the first area, to perform lane changing planning and control. For example, the information associated with the first area includes: a relative distance between a host vehicle and an obstacle in the first area, a lane changing time, and an average acceleration/deceleration.

In an embodiment, the automated lane changing device 2000 for a vehicle may further include a division apparatus.

The division apparatus is configured to divide the target lane into a plurality of areas based on a signal input by a vehicle sensor, where the plurality of areas include an overtake-to-change-lane area, a wait-to-change-lane area, and a direct lane changing area. Certainly, those skilled in the art can understand that the division apparatus may alternatively perform division based on vehicle condition information (such as a current speed and vehicle performance) of the host vehicle. The division manner is not specifically limited in the disclosure.

In an embodiment, the automated lane changing device 2000 for a vehicle further includes a check apparatus. The check apparatus is configured to check areas available for lane changing in the plurality of areas based on motion information of the host vehicle and of an obstacle around the host vehicle. In an embodiment, the areas available for lane changing include two or more areas. In this embodiment, the selection apparatus 230 may be configured to: calculate, for each area in the two or more areas, a score of the host vehicle to an expected lane changing point corresponding to the area; and select an area with the highest score as the target area for final lane changing, where the score of the host vehicle to the expected lane changing point corresponding to the area is calculated based on safety of the host vehicle changing lane to the area, lane changing efficiency, and comfort.

In an embodiment, the automated lane changing device 2000 for a vehicle may include an area division module, an area expected point calculation module, an area availability check module, an optimal area selection module, and an area information calculation module. The area division module divides the target lane for lane changing into three areas based on the situation of the obstacle around the vehicle. Next, the area expected point calculation module calculates, based on information about the obstacle included in this area, an expected lane changing point of each area for lane changing, while the area availability check module calculates, based on a safety condition for lane changing for the host vehicle, whether the host vehicle can implement lane changing in this area. If there are a plurality of areas in which lane changing can be completed, the optimal area selection module evaluates different areas based on the comfort, safety, and efficiency of the area to which the host vehicle changes lane, and selects an optimal area. Finally, this area is converted by the area information calculation module into information available for a downstream module and is then sent.

In the foregoing embodiment, the area division module performs, by using a target signal input by a vehicle sensor, area division of mainly dividing the target lane into three areas, i.e. an overtake-to-change-lane area, a wait-to-change-lane area, and a direct lane changing area. Moreover, obstacle information of the three areas is sent to the area expected point calculation module. The area expected point calculation module calculates, based on the obstacle information of the different areas in a case of lane changing to the area, an optimal lane changing terminal point position and a time required for the vehicle to change lane to the position. At the same time, the area availability check module calculates, based on motion information of the host vehicle and of the obstacle around the host vehicle, an area in which lane changing can be performed. If there are a plurality of areas that can all meet lane changing requirements, the optimal area selection module evaluates performance of the host vehicle based on the different areas for lane changing, and gives scores for the areas. An area with the highest score exceeding a threshold is finally selected as a target area for final lane changing. The information about this area is converted by the area information calculation module into information available for the downstream module and is then sent.

Those skilled in the art readily understand that the automated lane changing method for a vehicle provided in one or more embodiments of the disclosure can be implemented by using a computer program. For example, when a computer storage medium (such as a USB flash drive) storing the computer program is connected to a computer, the automated lane changing method 1000 for a vehicle in one or more embodiments of the disclosure can be performed by executing the computer program.

In addition, the automated lane changing device 2000 for a vehicle in one or more embodiments of the disclosure may be included in advanced driver assistance systems (ADAS). The advanced driver assistance systems (ADAS) may be installed in the vehicle in an embodiment.

The term "advanced driver assistance systems" is also referred to as ADAS. The advanced driver assistance systems use a variety of sensors (such as a millimeter-wave radar, a laser radar, a monocular/binocular camera, and satellite navigation) mounted on an automobile to sense the surrounding environment at any time during traveling of the automobile, collect data, identify, monitor, and track a still/moving object, and perform system operations and analysis in combination with navigation map data, allowing for a driver to be aware of potential dangers in advance, thereby effectively improving the comfort and safety of the automobile during traveling. In an embodiment, the advanced driver assistance systems include a traffic message channel (TMC) system, an intelligent speed adaptation or intelligent speed advice (ISA) system, a vehicular communication systems, an adaptive cruise control (ACC) system, a lane departure warning system (LDWS), a lane keeping assistance system, a collision avoidance system or a pre-crash system, a night vision system, an adaptive light control system, a pedestrian protection system, an automatic parking system, a traffic sign recognition system, a blind spot detection system, a driver drowsiness detection system, a hill descent control system, and an electric vehicle warning sounds system.

In conclusion, according to one or more embodiments of the disclosure, before and during lane changing for a vehicle, a target lane is divided based on information about an obstacle around the vehicle, and an area with the lowest cost for lane changing (an optimal area) is calculated from available areas. Real-time calculation of an optimal area for lane changing improves the lane changing efficiency, the success rate of lane changing, and the lane changing safety, thereby solving the problems in lane changing for a vehicle in a relatively complex scenario.

Although only some embodiments of the disclosure are described in the specification, it will be appreciated by those skilled in the art that the disclosure may be embodied in many other forms without departing from the essence and scope thereof. Accordingly, the presented examples and implementations are considered to be illustrative rather than restrictive, and the disclosure may encompass various modifications and replacements without departing from the spirit and scope of the disclosure that are defined by the appended claims.

What is claimed:
1. An automated lane changing method for a vehicle, comprising:

obtaining a plurality of areas in a target lane, wherein the plurality of areas are determined based on a signal input by a vehicle sensor;

calculating, based on information about an obstacle comprised in each area in the plurality of areas, an expected lane changing point for the area;

selecting, based on the expected lane changing point and an availability check result for the plurality of areas, a first area in the plurality of areas as a target area for final lane changing;

calculating an optimal area, within the target area, for lane changing in real time during lane changing, wherein the optimal area provides better performance in terms of comfort, safety, and lane changing efficiency than other areas in the target area;

calculating whether the vehicle can return to an original lane in the case that the lane changing cannot be performed due to an obstacle around the vehicle during the lane changing; and controlling the vehicle based on information associated with the first area, information associated with the optimal area, and a calculation result of whether the vehicle can return to the original lane, wherein the availability check result for the plurality of areas comprises areas available for lane changing in the plurality of areas, and wherein the areas available for lane changing comprise two or more areas, and selecting, based on the expected lane changing point and the availability check result for the plurality of areas, the first area in the plurality of areas as the target area for final lane changing comprises:

calculating, for each area in the two or more areas, a score of the vehicle to an expected lane changing point corresponding to the area; and selecting an area with the highest score as the target area for final lane changing, wherein the score of the vehicle to the expected lane changing point corresponding to the area is calculated based on i) safety of the vehicle related to a relative distance between the vehicle and an obstacle, ii) lane changing efficiency related to an amount of time taken by the vehicle to change lanes, and iii) comfort related to an average acceleration/deceleration of the vehicle when changing lanes.

2. The method according to claim 1, wherein the plurality of areas comprise an overtake-to-change-lane area, a wait-to-change-lane area, and a direct lane changing area.

3. The method according to claim 1, wherein the areas available for lane changing are determined based on motion information of the vehicle and of the obstacle around the vehicle.

4. An automated lane changing device for a vehicle, comprising:
a vehicle sensor;
a processor; and
a storage apparatus storing a group of machine executable instructions, wherein the instructions are adapted to be loaded and executed by the processor to:
divide a target lane into a plurality of areas based on a signal input by the vehicle sensor;
receive the plurality of areas in the target lane;
calculate, based on information about an obstacle comprised in each area in the plurality of areas, an expected lane changing point for the area; and select, based on the expected lane changing point and an availability check result for the plurality of areas, a first area in the plurality of areas as a target area for final lane changing;

calculate an optimal area, within the target area, for lane changing in real time during lane changing, wherein the optimal area provides better performance in terms of comfort, safety, and lane changing efficiency than other areas in the target area;

calculate whether the vehicle can return to an original lane in the case that the lane changing cannot be performed due to an obstacle around the vehicle during the lane changing; and control the vehicle based on information associated with the first area, information associated with the optimal area, and a calculation result of whether the vehicle can return to the original lane, wherein the availability check result for the plurality of areas comprises areas available for lane changing in the plurality of areas, and wherein the areas available for lane changing comprise two or more areas, and selecting, based on the expected lane changing point and the availability check result for the plurality of areas, the first area in the plurality of areas as the target area for final lane changing comprises:

calculating, for each area in the two or more areas, a score of the vehicle to an expected lane changing point corresponding to the area; and selecting an area with the highest score as the target area for final lane changing, wherein the score of the vehicle to the expected lane changing point corresponding to the area is calculated based on i) safety of the vehicle related to a relative distance between the vehicle and an obstacle, ii) lane changing efficiency related to an amount of time taken by the vehicle to change lanes, and iii) comfort related to an average acceleration/deceleration of the vehicle when changing lanes.

5. The device according to claim 4, wherein the plurality of areas comprise an overtake-to-change-lane area, a wait-to-change-lane area, and a direct lane changing area.

6. The device according to claim 4, wherein the instructions are further adapted to be loaded and executed by the processor to check the areas available for lane changing in the plurality of areas based on motion information of the vehicle and of the obstacle around the vehicle.

7. A non-transitory computer storage medium, comprising instructions, wherein when the instructions are executed, an automated lane changing method for a vehicle is performed, the method comprising:

obtaining a plurality of areas in a target lane, wherein the plurality of areas are determined based on a signal input by a vehicle sensor;

calculating, based on information about an obstacle comprised in each area in the plurality of areas, an expected lane changing point for the area; and selecting, based on the expected lane changing point and an availability check result for the plurality of areas, a first area in the plurality of areas as a target area for final lane changing;

calculating an optimal area, within the target area, for lane changing in real time during lane changing, wherein the optimal area provides better performance in terms of comfort, safety, and lane changing efficiency than other areas in the target area;

calculating whether the vehicle can return to an original lane in the case that the lane changing cannot be performed due to an obstacle around the vehicle during the lane changing; and controlling the vehicle based on information associated with the first area, information associated with the optimal area, and a calculation result of whether the vehicle can return to the original lane, wherein the availability check result for the plurality of areas comprises areas available for lane changing in the plurality of areas, and wherein the areas available for lane changing comprise two or more areas, and selecting, based on the expected lane changing point and the availability check result for the plurality of areas, the first area in the plurality of areas as the target area for final lane changing comprises:

calculating, for each area in the two or more areas, a score of the vehicle to an expected lane changing point corresponding to the area; and selecting an area with the highest score as the target area for final lane changing, wherein the score of the vehicle to the expected lane changing point corresponding to the area is calculated based on i) safety of the vehicle related to a relative distance between the vehicle and an obstacle, ii) lane changing efficiency related to an amount of time taken by the vehicle to change lanes, and iii) comfort related to an average acceleration/deceleration of the vehicle when changing lanes.

8. The non-transitory computer storage medium according to claim 7, wherein the plurality of areas comprise an overtake-to-change-lane area, a wait-to-change-lane area, and a direct lane changing area.

9. The non-transitory computer storage medium according to claim 7, wherein the areas available for lane changing are determined based on motion information of the vehicle and of the obstacle around the vehicle.

* * * * *